United States Patent Office 3,213,122
Patented Oct. 19, 1965

---

3,213,122
THIOPHOSPHORIC ACID ESTERS AND PROCESS
FOR THE PRODUCTION THEREOF
Gerhard Schrader, Wuppertal-Cronenberg, Germany, assignor to Farbenfabriken Bayer Aktiengesellschaft, Leverkusen, Germany, a corporation of Germany
No Drawing. Filed Oct. 27, 1960, Ser. No. 65,296
Claims priority, application Germany, Oct. 30, 1959,
F 29,738
11 Claims. (Cl. 260—461)

The present invention relates to and has as its object a new and useful process for the production of thiophosphoric acid esters. According to this new process, new compounds are obtained which distinguish themselves by a highly insecticidal action. The new compounds of the present invention may be represented by the following general formula:

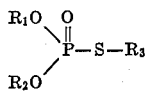

in which $R_1$ and $R_2$ stand for alkyl radicals substituted by alkyl-mercapto groups, carboxylic ester groups, carboxylic amide groups, amino groups, halogen atoms and the like and wherein one of $R_1$ and $R_2$ also may stand for an alkyl radical between one and four carbon atoms which is not further substituted.

$R_3$ in this formula stands for a phenyl radical which may be substituted by lower alkyl groups, halogen atoms, nitro groups and the like.

O,O-dialkyl-S-aryl-phosphoric acid esters are obtainable according to the process described in German patent specification No. 817,753 from arylsulphenic acid chlorides and dialkyl phosphites. The corresponding O,O-dialkyl-S-alkyl-phosphoric acid esters can be obtained for example according to the instructions of German patent specification No. 818,352 from dialkyl phosphites and alkylthiocyanates.

Surprisingly it has now been found that optional O,O-dialkyl-S-aryl- and -S-alkyl-phosphoric acid esters are obtainable by reacting trialkyl phosphites on sulphenyl-mono- or di-thioates. The said mono- or di-thioates are either known from the literature or some new are easily obtainable according to the instructions of the copending patent application Serial No. 63,264, filed October 18, 1960, now abandoned.

The action of trialkyl phosphites on the above mentioned thioates proceeds according to the following reaction scheme:

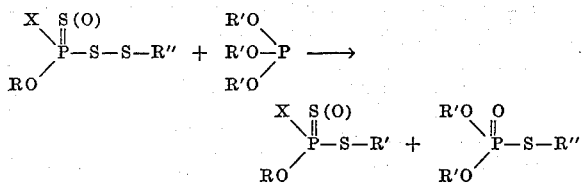

In the preceding formulae, R stands for an alkyl radical, R' for an alkyl radical which may be arbitrarily substituted, R" for an optional eventually substituted alkyl or aryl radical and X for an alkoxy group, an alkyl or aryl radical.

During the alkylation of the thioate at the thiol sulphur by trialkyl phosphite, there occurs at the same time a phosphorylation of the sulphenic acid radical.

This reaction is surprising and could not be foreseen. In both directions, it leads to esters some of which are known while others are new and obtainable in an extremely elegant and simple manner according to the process here described. Some esters obtainable by this reaction could not be prepared by conventional methods known as yet.

Even complicated trialkyl phosphites such as

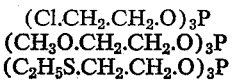

can easily be reacted and especially the O,O-dialkyl-S-aryl- or -S-alkyl-phosphates obtained therewith are only obtainable by the present reaction and are in no other ways obtainable.

The process of the invention is not limited to the use of symmetrical trialkyl phosphites. Equally good results are obtained by subjecting asymmetrical trialkyl phosphites to the novel reaction.

Thus, for example, the reaction of the asymmetrical phosphite having the constitution

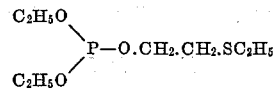

and known from J. Am. Chem. Soc., 80 (1958), 1150–1154, with the dithioate

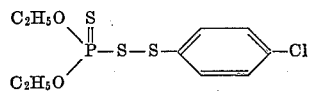

leads to the following new O,O-dialkyl-S-aryl-phosphoric acid ester:

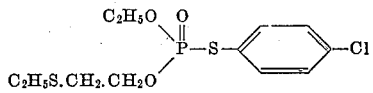

The reaction of the alkyl- or aryl-sulphenyl-thioates with trialkyl phosphites proceeds exothermically in most cases. It is advantageous to work at low temperatures in the presence of suitable solvents. As solvents, hydrocarbons or chlorinated hydrocarbons such as benzene, ligroin, chlorobenzene and the like have proved to be useful. The reaction temperature should, in general, not exceed 50° C.

The O,O-dialkyl-S-aryl or -S-alkyl-phosphoric acid esters resulting from the present process and part of which has not been described, are intended to be used as pest control agents. They very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e., in a concentration from about 0.00001% to about 1%, diluted or extended with suitable solid or liquid carriers or diluents. Examples of such solid or liquid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula:

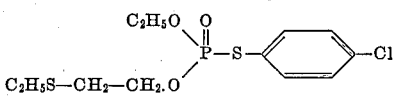

has been tested against flies and aphids. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This pre-mixture then is diluted with water to the desired concentration. The tests have been carried out as follows: (a) against flies (*Musca domestica*). About 50 flies are placed under covered petri dishes in which drip wet filter paper has been placed which is sprayed with an insecticidal solution of a concentration as shown below and prepared as stated above. The living status has been determined after 24 hours. The following results have been obtained: Flies were killed completely with solutions of 0.0001% and 0.01%. (b) Against aphids (species *Doralis fabae*). Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. The following results have been obtained: Aphids were killed completely with 0.001% solutions.

The following examples are given for the purpose of illustrating the process according to the invention.

*Example 1*

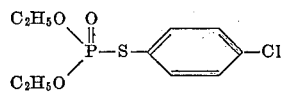

83 g. (0.25 mol) of the p-chlorosulphenyl-dithioate of the following constitution

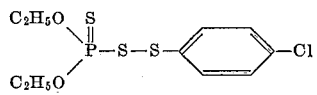

are dissolved in 200 ml. of benzene. 43 g. of triethyl phosphite are added while stirring. Care is taken by external cooling, that the temperature does not exceed 40° C. When the reaction is completed, the reaction product is stirred at 40° C. for a further hour and then fractionated. 63 g. of O,O-diethyl-S-ethyl-thionophosphate of B.P. 54° C./0.01 mm. Hg and 60 g. of O,O-diethyl-S-p-chlorophenyl-phosphate of B.P. 103° C./0.01 mm. Hg are thus obtained.

Calculated for mol 281: Cl, 12.6%; P, 11.0%; S, 11.4%. Found: Cl, 11.8%; P, 11.0%; S, 12.0%.

Aphids and spider-mites are killed completely with a solution of 0.01%. The compound shows an ovicidal action against the eggs of the red spider.

On rats per os the ester has a mean toxicity of 10 mg./kg.

*Example 2*

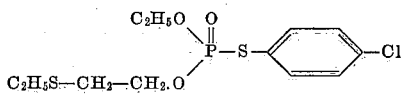

83 g. (0.25 mol) of the p-chlorosulphenyl-dithioate having the constitution described in Example 1 are dissolved in 200 ml. of benzene. 57 g. of O,O-diethyl-O,β-ethyl-mercapto-ethyl-phosphorus acid ester are added dropwise while stirring. Care is taken by external cooling that the temperature does not exceed 40° C. The reaction product is kept at 40° C. for another 2 hours and fractionated. 42 g. of O,O-diethyl-S-ethyl-thio-phosphate and 60 g. of O,β - ethyl-mercapto-ethyl-O-ethyl-S-p-chlorophenyl-phosphate of B.P. 114° C./0.01 mm. Hg are thus obtained. Yield: 71% of the theoretical. Flies are killed completely with a solution of 0.0001%. Aphids are killed completely with a solution of 0.001%.

On rats per os the ester has a toxicity of $LD_{50}$ 10 mg./kg.

By the same way there may be obtained the following compounds:

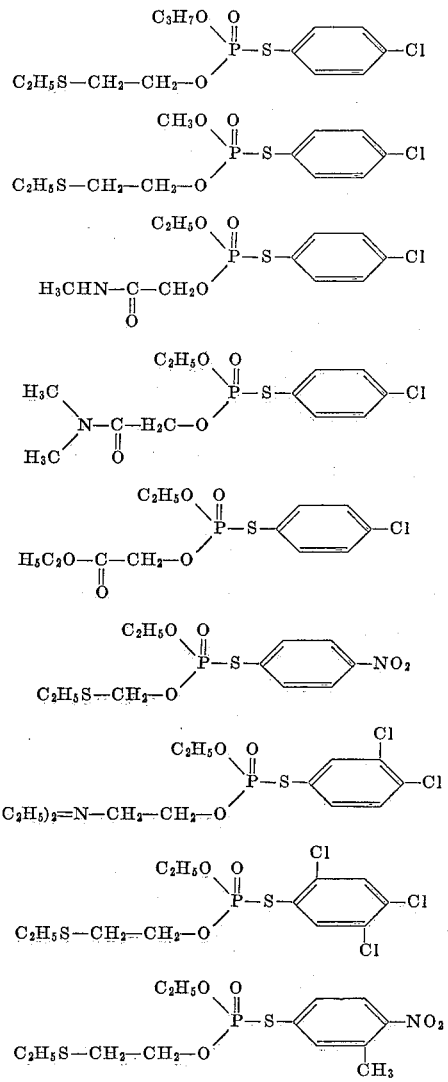

*Example 3*

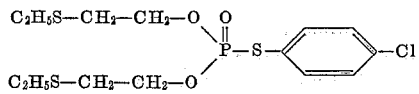

83 g. (0.25 mol) of p-chlorosulphenyl-dithioate of the constitution given in Example 1 are dissolved in 200 ml. of benzene. 87 g. of tris-(β-ethylmercapto-ethyl) phosphite ($n_D^{23}$ 1.5112) are added while stirring. The product is stirred at 40° C. for a further 2 hours and, after distilling off the benzene, a mixture is obtained which consists of equal parts of the following phosphoric acid esters:

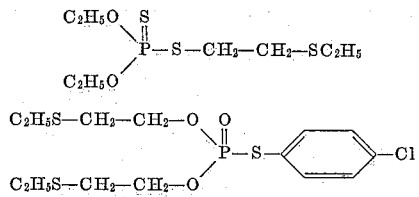

Flies are killed completely with a solution of 0.0001%. Aphids are killed completely with a solution of 0.001%.

On rats per os the ester has a toxicity of $LD_{50}$ 25 mg./kg.

By the same way there may be obtained the following compounds:

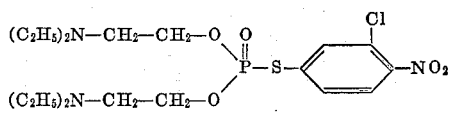

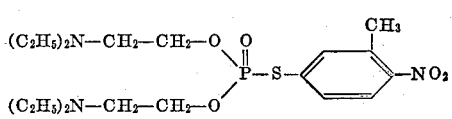

*Example 4*

76 g. (0.25 mol) of p-chlorosulphenyl-dithioate of the following constitution

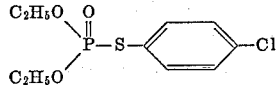

are dissolved in 200 ml. of benzene. 43 g. of triethyl phosphite are added dropwise while stirring. The reaction product is kept at 40° C. for 2 hours and then fractionated. 44 g. of O,O-dimethyl-S-ethyl-thionophosphate (B.P. 35° C./0.05 mm. Hg) and 59 g. of O,O-diethyl-S-p-chlorophenyl-phosphate of B.P. 102° C./0.01 mm. Hg are thus obtained. Yield: 84% of the theoretical.

*Example 5*

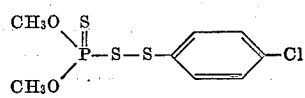

53 g. (0.166 mol) of p-chlorosulphenyl-thioate of the following constitution

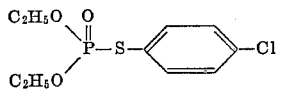

are dissolved in 150 ml. of benzene. 28 g. of triethyl phosphite are added at 30° C. The reaction product is kept at 40° C. for a further 2 hours and then fractionated. 31 g. of O,O-diethyl-S-ethylphosphate and 34 g. of O,O-diethyl-S-p-chlorophenyl-phosphate of B.P. 102–103° C./0.01 mm. Hg are thus obtained. Yield: 72% of the theoretical.

*Example 6*

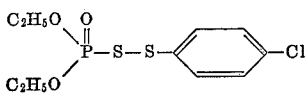

63 g. (0.2 mol) of p-chlorosulphenyl-dithioate of the following constitution

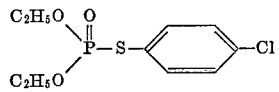

are dissolved in 200 ml. of benzene. 34 g. of triethylphosphite are added at 30° C. while stirring. The reaction product is stirred at 40–45° C. for further two hours and then fractionated. 34 g. of methyl-thionophosphone-OC₃H₇i-SC₂H₅ ester and 44 g. of O,O-diethyl-S-p-chlorophenyl-phosphate of B.P. 101–103° C./0.01 mm. Hg are thus obtained. Yield: 78% of the theoretical.

*Example 7*

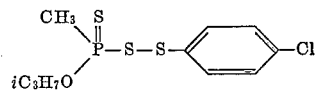

83 g. (0.25 mol) of p-chlorosulphenyl-dithioate of the following constitution

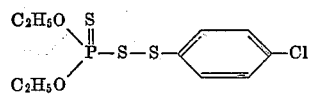

are dissolved in 200 ml. of benzene. 68 g. of tris-(β-chloroethyl) phosphite are added at 30° C. while stirring. The reaction product is stirred at 45° C. for a further 2 hours and then fractionated. In this manner, 53 g. of O,O-diethyl-S-β-chloroethyl-thionophosphate of B.P. 86° C./0.01 mm. Hg and 64 g. of O,O-β-chloroethyl-S-p-chlorophenyl-phosphate of B.P. 136° C./0.01 mm. Hg are obtained. Yield: 73% of the theoretical. Flies are killed completely with a solution of 0.01%. Caterpillars are killed completely with a solution of 0.1%.

On rats per os the ester has a toxicity of LD₅₀ 250 mg./kg.

By the same way there may be obtained the following compounds:

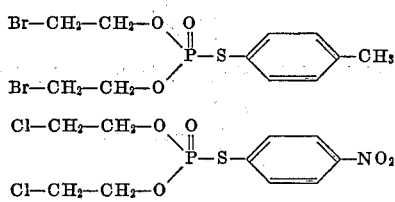

I claim:
1. A compound of the following formula

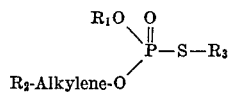

wherein $R_1$ stands for a member of the group consisting of lower alkyl having up to 4 carbon atoms, lower alkyl mercapto alkylene, lower dialkyl amino alkylene, lower alkyl amino carbonyl alkylene and ROOC-alkylene, wherein the alkylene groups have up to 4 carbon atoms and R is lower alkyl; $R_2$ stands for a member selected from the group consisting of lower alkyl mercapto, lower dialkyl amino, lower alkyl amino carbonyl and ROOC wherein R is lower alkyl and Alkylene stands for alkylene having up to 4 carbon atoms and $R_3$ stands for a member of the group consisting of phenyl, lower alkyl phenyl, chlorophenyl and nitrophenyl.

2. A compound of claim 1 wherein $R_1$ is lower alkyl having up to 4 carbon atoms, $R_2$ is lower alkyl mercapto and $R_3$ is chlorophenyl.

3. A compound of claim 1 wherein $R_1$ is lower alkyl having up to 4 carbon atoms, $R_2$ is lower alkyl amino carbonyl and $R_3$ is chlorophenyl.

4. A compound of claim 1 wherein $R_1$ is lower alkyl mercapto alkylene, $R_2$ is lower alkyl mercapto and $R_3$ is chlorophenyl.

5. A compound of claim 1 wherein $R_1$ is lower alkyl having up to 4 carbon atoms, $R_2$ is lower dialkyl amino and $R_3$ is chlorophenyl.

6. The compound of the following formula:

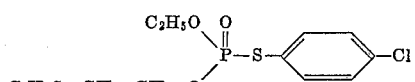

7. The compound of the following formula:

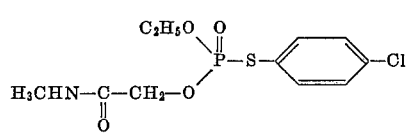

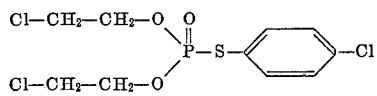

8. The compound of the following formula:

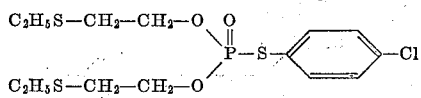

9. The compound of the following formula

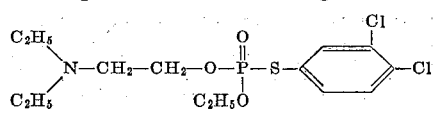

10. A method of preparing a thiophosphoric acid ester of the formula

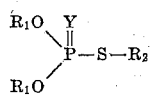

which comprises contacting a trialkyl phosphite of the formula

with a sulphenylphosphorus thioate of the formula

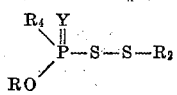

wherein $R_1$ stands for a member selected from the group consisting of lower alkyl having up to 4 carbon atoms, lower alkyl mercapto alkylene, lower dialkyl amino alkylene, lower alkyl amino carbonyl alkylene and $R_3OOC$ wherein $R_3$ stands for lower alkyl and the alkylene groups have up to 4 carbon atoms, $R_2$ stands for a member selected from the group consisting of phenyl, lower alkyl phenyl, chlorophenyl and nitrophenyl, Y stands for a member selected from the group consisting of oxygen and sulfur, R stands for alkyl and $R_4$ stands for a member selected from the group consisting of alkyl and alkoxy.

11. The process of claim 10 wherein the contacting is done in the presence of a solvent and at a temperature not exceeding 50° C.

References Cited by the Examiner

UNITED STATES PATENTS

| | | | |
|---|---|---|---|
| 2,494,283 | 1/50 | Cassaday et al. | 260—461 |
| 2,690,450 | 9/54 | Gilbert et al. | 260—461 |
| 2,861,876 | 11/58 | Birum | 260—461 |
| 2,895,982 | 7/59 | Stiles | 260—461 |

CHARLES B. PARKER, *Primary Examiner.*

LESLIE H. GASTON, LEWIS GOTTS, IRVING MARCUS, JOSEPH P. BRUST, *Examiners.*